United States Patent
Qureshi et al.

(10) Patent No.: US 7,222,335 B2
(45) Date of Patent: May 22, 2007

(54) SYSTEM, METHOD AND COMPUTER PROGRAM PRODUCT FOR REPLACING A CONSTANT IN A CODE SEGMENT

(75) Inventors: Shiraz Ali Qureshi, Rocklin, CA (US); Sachin Navin Chheda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 10/652,445

(22) Filed: Aug. 29, 2003

(65) Prior Publication Data

US 2005/0050514 A1 Mar. 3, 2005

(51) Int. Cl.
*G06F 9/44* (2006.01)
(52) U.S. Cl. .................. 717/143; 717/136; 717/114
(58) Field of Classification Search .............. None
See application file for complete search history.

(56) References Cited

U.S. PATENT DOCUMENTS

| | | | |
|---|---|---|---|
| 5,748,975 A * | 5/1998 | Van De Vanter | 715/531 |
| 5,999,730 A * | 12/1999 | Lewis | 717/109 |
| 6,167,512 A | 12/2000 | Tran | |
| 6,185,677 B1 | 2/2001 | Nijhawa | |
| 6,453,461 B1 * | 9/2002 | Chaiken | 717/124 |
| 2005/0050514 A1 * | 3/2005 | Qureshi et al. | 717/110 |

OTHER PUBLICATIONS

Compaq Computer Corporation, Intel Corporation, Microsoft Corporation, Phoenix Technologies Ltd., Toshiba Corporation, "Advanced Configuration and Power Interface Specification", Revision 2.0a, Mar. 31, 2002, Online, [Retrieved on Jun. 22, 2006] from <http://acpi.info/Downloads/ACPIspec-2-0a.pdf>pp. 335-401.*

* cited by examiner

*Primary Examiner*—Tuan Dam
*Assistant Examiner*—Andrew Y. Chou

(57) ABSTRACT

A computer program that is executable by a computer system for causing the computer system to detect a character subsequent to a double quote mark and adjacent to a string in a double-quoted portion of a pre-processing directive and replace a constant associated with the pre-processing directive with the string is provided.

21 Claims, 5 Drawing Sheets

```
// header.h     204 define ACPI_CONST_1    "!DEVICE1"   214
     210   206              216  224 define ACPI_CONST_2    "!ACTION1"
     220   232              216  234 define C_CONST_1       "CONST1"
     230   242                  244 define OTHER_CONST_2   "$CONST2"
     240                         246
```

Fig. 2b

```
// ASL CODE
#Include "header.h"    202
Device(ACPI_CONST_1)   204
{
  Method(ACPI_CONST_2)  206
  {
  } // End Method
} // End Device
```

Fig. 2a

```
// ASL PRE-PROCESSED CODE   ←252

←254
Device(DEVICE1)
{
    Method(ACTION1)   ←256
    {
        . . . . . . . .
    } // End Method
    . . . . .
} // End Device
```

SYSTEM, METHOD AND COMPUTER PROGRAM PRODUCT FOR REPLACING A CONSTANT IN A CODE SEGMENT

FIELD OF THE INVENTION

The present invention generally relates to computer program languages, and more particularly, to replacing a constant in a code segment.

BACKGROUND OF THE INVENTION

A computer system typically includes numerous devices that work in conjunction with the processing and memory components of the system. These devices generally communicate with the system using standardized interfaces and protocols. Although the interfaces and protocols may be standardized, the devices themselves generally are not. The devices serve a wide variety of purposes and are designed and manufactured by an even wider variety of manufacturers.

One concern of computer system manufacturers involves managing the amount of power that a computer system consumes. To manage the power of the computer system, however, the power of the devices typically needs to be managed. One way of managing the power of both the system and the devices is to allow the operating system to control the power consumption of the system and devices.

The Advanced Configuration and Power Interface Specification (ACPI) provides industry standard interfaces to devices in computer systems to enable device configuration and power management using an operating system. ACPI provides a programming language known as the ACPI Source Language (ASL) to allow a computer or device manufacturer to generate code to accomplish the tasks associated with ACPI.

Unfortunately, ASL is a relatively primitive programming language. In particular, some programming language constructs that programmers have become accustomed to are not available to ASL programmers. As a result, ASL code may require additional effort to develop and may not be as high of quality code as code written in other programming languages.

It would be desirable to be able to efficiently generate high quality ASL code.

SUMMARY OF THE INVENTION

In an exemplary embodiment, the present disclosure provides a computer program that is executable by a computer system for causing the computer system to detect a character subsequent to a double quote mark and adjacent to a string in a double-quoted portion of a first pre-processing directive and replace a constant associated with the first pre-processing directive with the string.

BRIEF DESCRIPTION OF THE DRAWINGS

FIG. 2a is a diagram illustrating an embodiment of an ASL code segment.

FIG. 2b is a diagram illustrating an embodiment of a header file.

FIG. 2c is a diagram illustrating an embodiment of a pre-processed ASL code segment.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
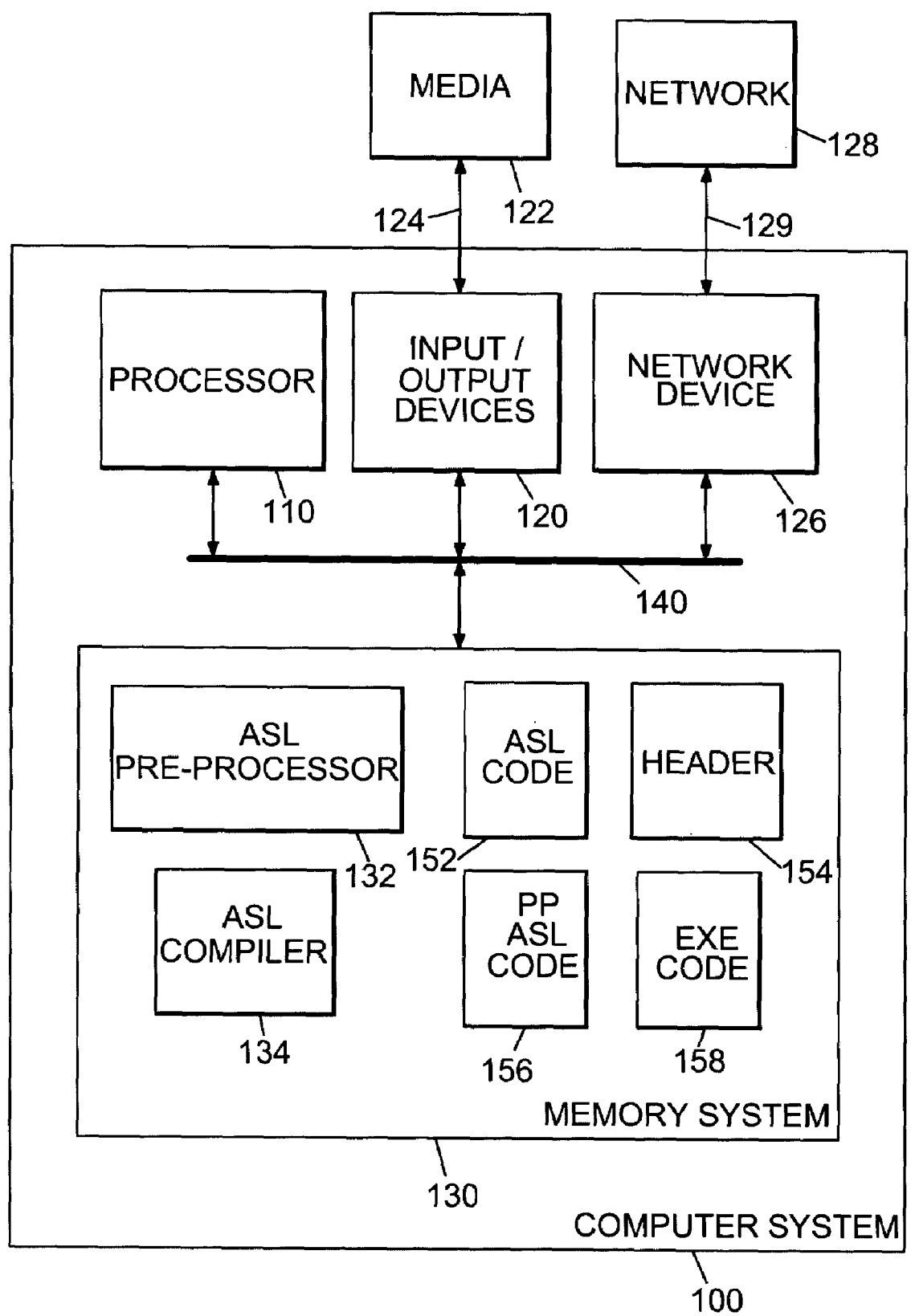
FIG. 1 is a diagram illustrating an embodiment of computer system that includes an ASL pre-processor.

FIG. 1 is a diagram illustrating an embodiment of computer system 100 that includes an Advanced Configuration and Power Interface (ACPI) Source Language (ASL) pre-processor 132. ASL pre-processor 132 processes an ASL code segment 152 to generate pre-processed ASL code 156 using a header file 154. ASL code segment 152 includes a set of ASL instructions. Header file 154 includes one or more pre-processing directives that each include a character that associates the directives with ASL pre-processor 132. An ASL compiler 134 generates executable code 158 by compiling pre-processed ASL code 156. Executable code 158 includes a set of ACPI Machine Language (AML) instructions.

Computer system 100 may be any type of computer system such as desktop, mobile, workstation, or server computer. Computer system 100 includes a processor 110, input/output (I/O) devices 120, a network device 126, a memory system 130, and busses 140. Computer system 100 also includes an operating system (not shown) that is executable by processor 110. Processor 110 executes instructions stored in memory system 130. In particular, processor 110 is configured to execute ASL pre-processor 132, ASL compiler 134, and executable code 158.

I/O devices 120 may include any type and number of devices configured to communicate with computer system 100. Each device may be internal or external to computer system 100.

Memory system 130 includes ASL pre-processor 132, ASL compiler 134, ASL code segment 152, header file 154, pre-processed ASL code 156, and executable code 158. Memory system 130 may include any type and number of memory devices such as a FLASH memory, a RAM, and a hard disk drive.

Computer system 100 is configured to receive information from and store information to media 122 using a wired or wireless connection 124 and one or more of I/O devices 120 (e.g., a CD-ROM or a floppy drive). In particular, computer system 100 may cause ASL pre-processor 132, ASL compiler 134, ASL code segment 152, header file 154, pre-processed ASL code 156, and executable code 158 to be read from or stored to media 122.

Computer system 100 is configured to communicate with network 122 using a wired or wireless connection 129. In particular, computer system 100 may cause ASL pre-processor 132, ASL compiler 134, ASL code segment 152, header file 154, pre-processed ASL code 156, and executable code 158 to be transmitted to or received from a remote storage device using network 128.

FIG. 2a is a diagram illustrating an embodiment of ASL code segment 152. Code segment 152 includes pre-processing directive 202, a first constant ACPI_CONST_1 204, and a second constant ACPI_CONST_2 206. Pre-processing directive 202 causes the contents of the file header.h to be included in ACPI code segment 152 prior to ACPI code segment 152 being pre-processed or compiled.

FIG. 2b is a diagram illustrating an embodiment of a header file 154 that is labeled header.h. Header file 154 includes pre-processing directives 210, 220, 230, and 240. Each pre-processing directive includes a constant and a double-quoted portion. The double-quoted portions each include a string between the double quote marks. The double-quoted portion of pre-processing directives 210 and 220 also include a zeta character 216, i.e. a !, and the double-quoted portion of pre-processing directive 240 also includes a special character 246, i.e. a $.

Pre-processing directives 210 and 220 each include zeta character 216, i.e. !. ACPI pre-processor 132 recognizes zeta character 216 to cause pre-processing directives 210 and 220 to be associated with ACPI code. In response to being executed, ACPI pre-processor 132 causes all instances of constant 204, i.e. ACPI_CONST_1, to be replaced with string 214, i.e. DEVICE1, in ACPI code segment 152 without including zeta character 216. Similarly, ACPI pre-processor 132 causes all instances of constant 206, i.e. ACPI_CONST_2, to be replaced with string 224, i.e. ACTION1, in ACPI code segment 152 without including zeta character 216. The presence of zeta character 216 in the double-quoted portions of pre-processing directives 210 and 220 makes strings 214 and 224 zeta-strings.

Pre-processing directives 230 and 240 do not include zeta character 216. Accordingly, these pre-processing directives are ignored by ACPI pre-processor 132. Pre-processors for other programming languages, however, may use pre-processing directives 230 and 240. For example, a C pre-processor 444 (shown in FIG. 4) uses pre-processing directive 230 as part of a C code segment. In particular, C pre-processor 444 causes a constant 232, i.e. C_CONST_1, to be replaced with a string 234, i.e. CONST1, in a C code segment (not shown).

Pre-processing directive 240 includes special character 246 in the double-quoted portion. Special character 246 causes pre-processing directive 240 to be associated with another pre-processor 454 (shown in FIG. 4). Pre-processor 454 is associated with a programming language other than C or ACPI such as Verilog. In response to pre-processing directive 240, pre-processor 454 causes each instance of a constant 242, i.e. OTHER_CONST_2, to be replaced with string 244, i.e. CONST2, without including special character 246 in a code segment in the programming language associated with pre-processor 454.

FIG. 2c is a diagram illustrating an embodiment of pre-processed ASL code 156. Pre-processed code 156 is generated by ASL pre-processor 132 using ASL code segment 152 and header file 154.

Pre-processed code 156 includes the contents of header file 154 as indicated by a box 252. In addition, all instances of constant 204, i.e. ACPI_CONST_1, have been replaced with string 214, i.e. DEVICE1, and all instances of constant 206, i.e. ACPI_CONST_2, have been replaced with string 224, i.e. ACTION1.

Figure 3:
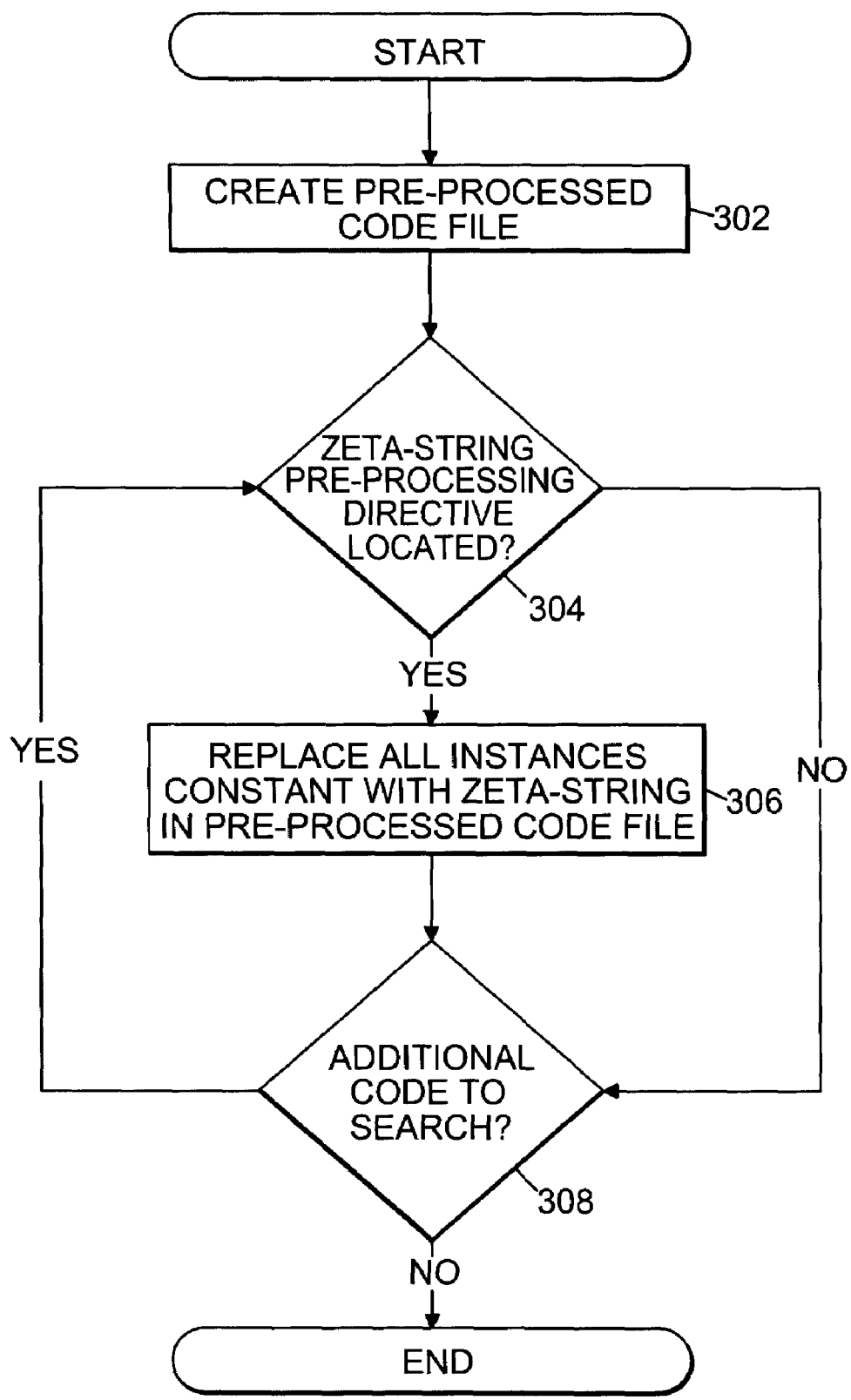
FIG. 3 is a flow chart illustrating an embodiment of a method for pre-processing ASL code.

FIG. 3 is a flow chart illustrating an embodiment of a method for pre-processing ASL code by ASL pre-processor 132. In FIG. 3, a pre-processed code file is created as indicated in a block 302. Pre-processor 132 causes ASL code from ASL code segment 152 and header file 154 to be modified, as needed, and stored in the file.

In processing ASL code segment 152 and header file 154, ASL pre-processor 132 determines whether a zeta-string pre-processing directive has been located as indicated in a block 304. As shown in FIG. 2b, a zeta-string pre-processing directive includes a constant and a zeta-string and is identified by a zeta character. ASL pre-processor 132 locates a zeta-string pre-processing directive by detecting a zeta character subsequent to a double quote mark and adjacent to a string in the double-quoted portion of a pre-processing directive. The zeta-string may be a command, an attribute, a device, an opcode, or a test parameter associated with ASL or any other language construct that ASL supports.

If a zeta-string pre-processing directive has been located, then ASL pre-processor 132 causes all instances of the constant defined by the zeta-string pre-processing directive to be replaced with the zeta-string in the file as indicated in a block 306. ASL pre-processor 132 ignores pre-processing directives that do not include a zeta character. In an alternative embodiment, ASL pre-processor 132 causes all instances of the constant to be replaced with the zeta-string prior to storing the constants in the file.

If a zeta-string pre-processing directive has not been located, then ASL pre-processor 132 determines whether there is additional code to search as indicated by a block 308. The additional code may include other zeta-string pre-processing directives. If there is additional code to search, then the function of block 304 is repeated. If there is no additional code to search, then the method ends.

Figure 4:
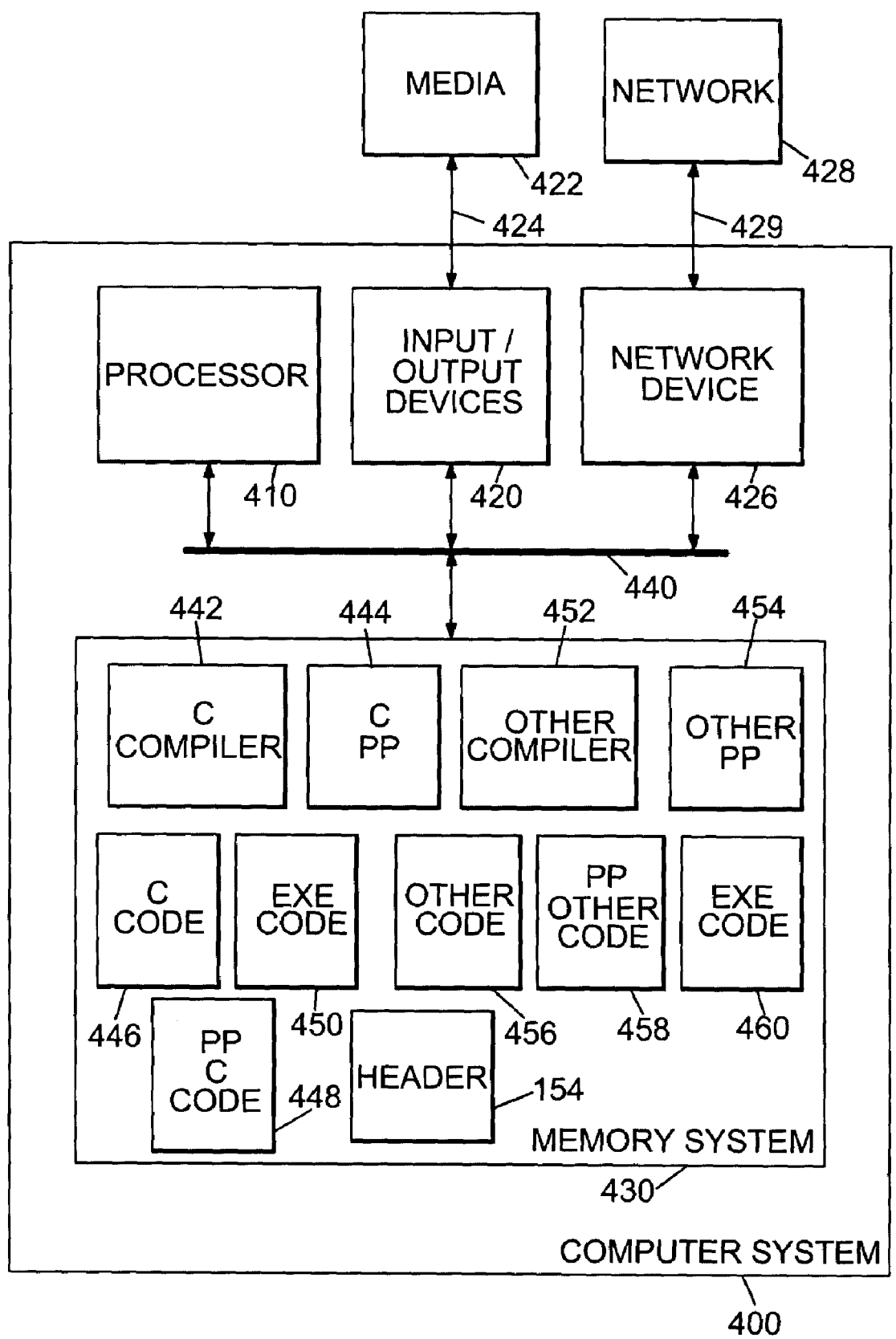
FIG. 4 is a diagram illustrating an alternative embodiment of computer system that includes a plurality of pre-processors.

FIG. 4 is a diagram illustrating an alternative embodiment of computer system 400 that includes a plurality of pre-processors.

Computer system 400 includes a processor 410, input/output (I/O) devices 420, a network device 426, a memory system 430, and busses 440. Computer system 400 also includes an operating system (not shown) that is executable by processor 410. Processor 410 executes instructions stored in memory system 430. In particular, processor 410 is configured to execute C pre-processor 444, C compiler 442, executable code 450, another pre-processor 454, another compiler 452, and executable code 460. As noted above, pre-processor 454 is associated with a programming language other than C or ACPI such as Verilog.

As with FIG. 1 described above, I/O devices 420 may include any type and number of devices configured to communicate with computer system 400, and each device may be internal or external to computer system 400.

Memory system 430 includes header 154, C compiler 442, C pre-processor 444, executable code 450, pre-processed C code 448, another compiler 452, another pre-processor 454, pre-processed other code 458, and executable code 460. Memory system 430 may include any type and number of memory devices such as a FLASH memory, a RAM, and a hard disk drive.

Computer system 400 is configured to receive information from and store information to media 422 using a wired or wireless connection 424 and one or more of I/O devices 420 (e.g., a CD-ROM or a floppy drive). In particular, computer system 400 may cause C compiler 442, C pre-processor 444, executable code 450, pre-processed C code 448, another compiler 452, another pre-processor 454, pre-processed other code 458, and executable code 460 to be read from or stored to media 122.

Computer system 400 is configured to communicate with network 422 using a wired or wireless connection 429. In particular, computer system 400 may cause C compiler 442, C pre-processor 444, executable code 450, pre-processed C code 448, another compiler 452, another pre-processor 454, pre-processed other code 458, and executable code 460 to be transmitted to or received from a remote storage device using network 428.

C code segment 446 includes a set of instructions in the C programming language, and other code segment 456 includes a set of instructions in a programming language other than C or ASL such as Verilog. Pre-processors 444 and 454 pre-process code segments 446 and 456, respectively, to generate pre-processed C code 448 and pre-processed other code 458, respectively. Compilers 442 and 452 compile pre-processed C code 448 and pre-processed other code 458, respectively, to generate executable code 450 and executable code 460, respectively.

In the embodiment of FIG. 4, C code segment 446 and other code segment 456 each include a pre-processing directive to cause header file 154 to be included. As a result, pre-processors 444 and 454 process pre-processing directives in header file 154 that are associated with their respective programming languages. Referring back to FIG. 2b where an embodiment of header file 154 is shown, pre-processors 444 and 454 are configured to use pre-processing directives 230 and 240, respectively.

Pre-processing directive 230 conforms to the syntax of the C programming language. Accordingly, in response to pre-processing C code segment 446, C pre-processor 444 causes all instances of constant 232, i.e. C_CONST_1 to be replaced with string 234, i.e. CONST1.

Pre-processing directive 240 conforms to the syntax of the programming language associated with pre-processor 454 by including special character 244, i.e. a $. By detecting special character 244, pre-processor 454 identifies an associated pre-processing directive. Accordingly, in response to pre-processing code segment 456, pre-processor 454 causes all instances of constant 242, i.e. OTHER_CONST_2 to be replaced with string 244, i.e. CONST2.

As a result of header file 154 including pre-processing directives that are associated with multiple programming languages, header file 154 may be used by different programming languages. Code segments written in different programming languages use only those constants which are in pre-processing directives that are associated with their language.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer program product comprising:
a computer program executable by a computer system for causing the computer system to:
detect a character subsequent to a double quote mark and adjacent to a string in a double-quoted portion of a first pre-processing directive; and
replace a constant associated with the first pre-processing directive with the string; and
a medium for storing the computer program.

2. The computer-program product of claim 1 wherein the character comprises a "!".

3. The computer-program product of claim 1 wherein the character occurs prior to the string.

4. The computer-program product of claim 1 wherein the computer program is processable by the computer system for causing the computer system to:
detect a second pre-processing directive that does not include the character; and
ignore the second pre-processing directive.

5. The computer-program product of claim 1 wherein the computer program comprises an Advanced Configuration and Power Interface (ACPI) Source Language (ASL) pre-processor.

6. The computer-program product of claim 1 wherein the computer program is executable by the computer system for causing the computer system to:
replace the constant associated with the first pre-processing directive with the string in a code segment.

7. The computer-program product of claim 1 wherein the code segment comprises Advanced Configuration and Power Interface (ACPI) Source Language (ASL) code.

8. A computer system comprising:
a processor; and
a storage medium that stores a computer program that is executable by the processor; and
wherein the computer program is associated with a programming language, wherein the computer program includes a constant that is replaceable with a string from a pre-processing directive associated with the constant, and wherein the pre-processing directive comprises a double-quoted portion that includes the string and a character that associates the pre-processing directive with the programming language between a pair of double quote marks.

9. The computer system of claim 8 wherein the programming language comprises Advanced Configuration and Power Interface (ACPI) Source Language (ASL).

10. The computer system of claim 8 wherein the string comprises a command.

11. The computer system of claim 8 wherein the string comprises an attribute.

12. The computer system of claim 8 wherein the string comprises a device name.

13. The computer system of claim 8 wherein the string comprises an opcode.

14. A method performed by a computer system comprising:
detecting a character subsequent to a double quote mark in a pre-processing directive; and
replacing a constant associated with the pre-processing directive with a string adjacent to the character in a code segment.

15. The method of claim 14 further comprising:
creating a file; and
storing the code segment into the file.

16. The method of claim 14 wherein the code segment comprises Advanced Configuration and Power Interface (ACPI) Source Language (ASL) code.

17. The method of claim 14 wherein the string comprises a zeta-string.

18. A computer system comprising:

a storage medium;

a file stored in the storage medium that includes a first pre-processing directive and a second pre-processing directive; and wherein the first pre-processing directive is usable by a first pre-processor that is associated with a first programming language wherein the first pre-processing directive is configured to cause the first pre-processor to replace a first constant in a first code segment with a first string, wherein the second pre-processing directive is usable by a second pre-processor that is associated with a second programming language" insert wherein the second pre-processing directive is configured to cause the second pre-processor to replace a second constant in a second code segment with a second string.

19. The computer system of claim 18 wherein the first code segment includes a first set of instructions in the first programming language, and wherein the second code segment includes a second set of instructions in the second programming language.

20. The computer system of claim 18 wherein the first programming language comprises Advanced Configuration and Power Interface (ACPI) Source Language (ASL).

21. The computer system of claim 18 wherein the file comprises a header file.

* * * * *

UNITED STATES PATENT AND TRADEMARK OFFICE
CERTIFICATE OF CORRECTION

| | |
|---|---|
| PATENT NO. | : 7,222,335 B2 |
| APPLICATION NO. | : 10/652445 |
| DATED | : May 22, 2007 |
| INVENTOR(S) | : Shiraz Ali Qureshi et al. |

Page 1 of 1

It is certified that error appears in the above-identified patent and that said Letters Patent is hereby corrected as shown below:

In column 7, line 13, in Claim 18, delete "language" insert" and insert -- language, --, therefor.

Signed and Sealed this

Ninth Day of September, 2008

JON W. DUDAS
*Director of the United States Patent and Trademark Office*